Figures 1, 1A:
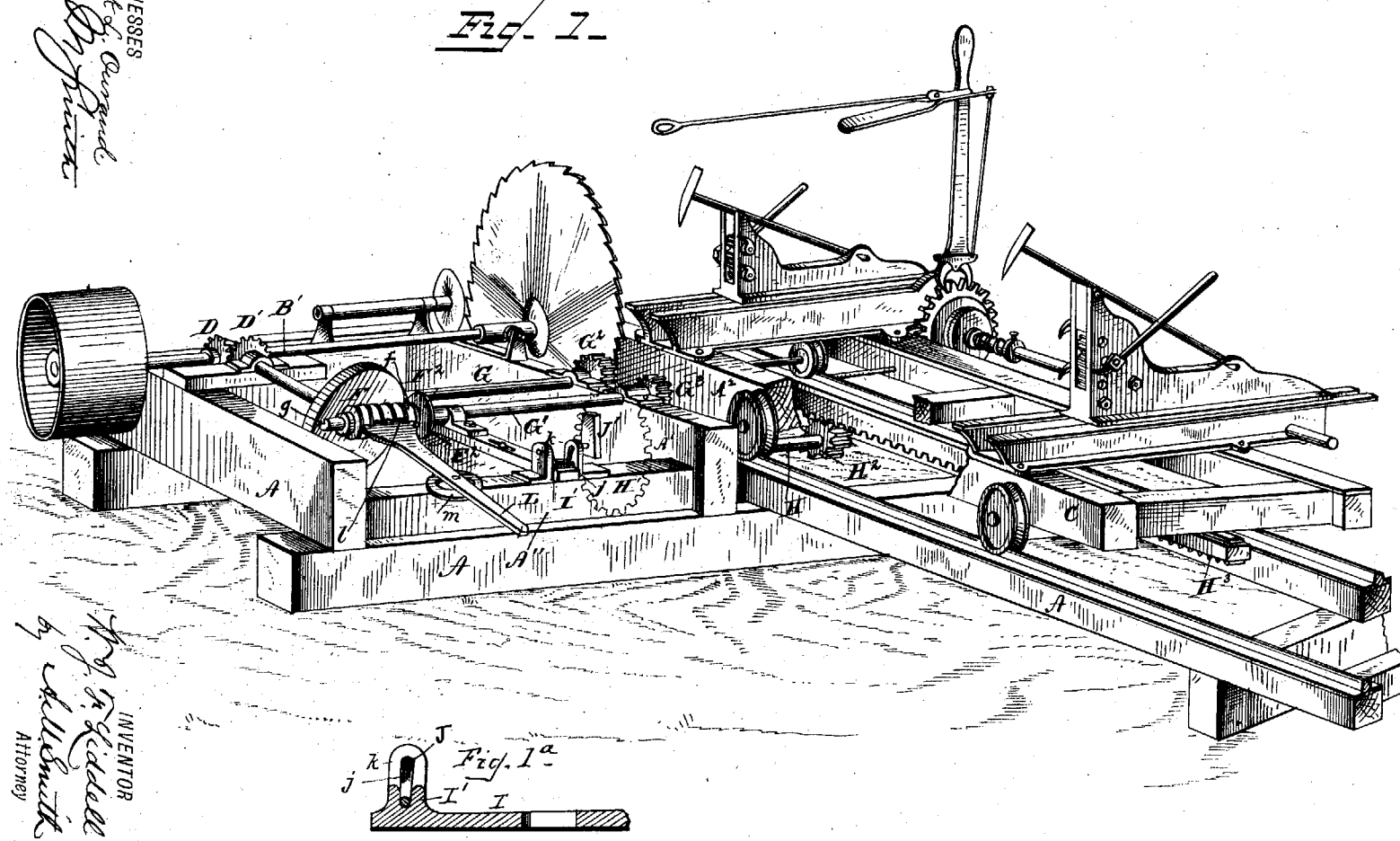

2 Sheets—Sheet 1.

W. J. F. LIDDELL.

CIRCULAR SAW MILL.

No. 10,474. Reissued May 6, 1884.

WITNESSES

Frank L. Ourand

Rex D. Smith

INVENTOR

W. J. F. Liddell by Ad. L. Smith

Attorney

N. PETERS, Photo-Lithographer, Washington, D. C.

W. J. F. LIDDELL.
CIRCULAR SAW MILL.
No. 10,474. Reissued May 6, 1884.
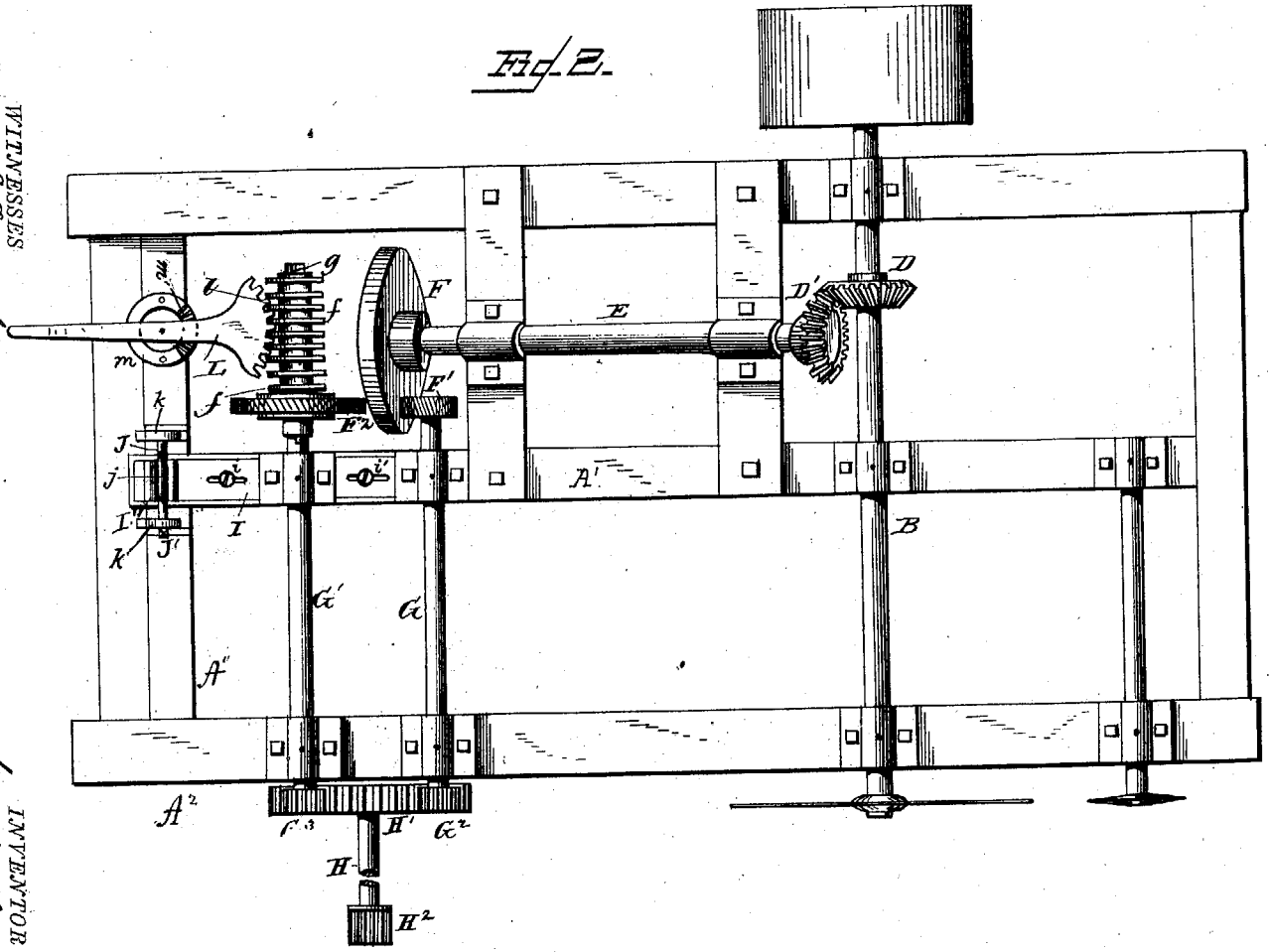
WITNESSES
Franck L. Durand
Ed. M. Smith
INVENTOR
W. J. F. Liddell
by A. M. Smith
Attorney
N. PETERS, Photo-Lithographer, Washington, D. C.

UNITED STATES PATENT OFFICE.

WALTER J. F. LIDDELL, OF CHARLOTTE, NORTH CAROLINA.

CIRCULAR SAW MILL.

SPECIFICATION forming part of Reissued Letters Patent No. 10,474, dated May 6, 1884.

Original No. 274,129, dated March 20, 1883. Application for reissue filed December 5, 1883.

*To all whom it may concern:*

Be it known that I, WALTER J. F. LIDDELL, of Charlotte, county of Mecklenburg, State of North Carolina, have invented a new and useful Improvement in Circular Saw Mills, of which the following is a full, clear, and exact description, reference being had to the accompanying drawings, making part of this specification.

My invention relates to a novel arrangement of friction-feed for saw-carriages; and it consists in the combination, with the saw-mandrel, of a second shaft connected with and driven from said mandrel by toothed gears, insuring its positive rotation, said shaft being provided with a friction wheel or disk, through which motion is imparted to the saw-mill carriage; also, in the combination, in the feed mechanism, of a friction wheel or disk secured to one end of its shaft, and a second friction-wheel geared to the saw-mill carriage and made adjustable across the face of the first or driving disk; in the combination, with the friction-disk geared to and driven from the saw-mandrel, of friction-wheels arranged on opposite sides of the driving-disk on adjustable shafts geared to the saw-mill carriage; and in a novel means for adjusting the friction-wheels, as hereinafter described.

In the accompanying drawings, Figure 1 is a perspective view of the supporting-frame and carriage with my improvements applied, and Fig. 2 is a plan view of the same.

A A′ A² represent the supporting-frame, B the saw mandrel or shaft mounted in suitable bearings thereon, and C the traveling carriage for the material to be operated upon, said parts and the mechanism for actuating the saw-mandrel and saw being of any suitable or preferred construction and arrangement. The mandrel B has secured to it a bevel or miter wheel, D, which engages with and communicates motion to a similar wheel, D′, secured to one end of a shaft, E, arranged at right angles to the saw-mandrel in suitable bearings in transverse bars A of the frame, and provided on its opposite or rear end with a friction wheel or disk, F, secured to and rotating with said shaft E.

G and G′ are transverse shafts arranged in transverse vertical planes on opposite sides of the disk F in bearings on the longitudinal frame-timbers A′ A², and provided on their ends overlapping said disk on opposite sides with friction-wheels F′ and F², adapted to be moved into or out of frictional contact or engagement with the disk F. The shafts G and G′ are provided at their ends opposite the friction-wheels with pinions G² G³, both engaging with a spur-gear, H′, on the inner end of a transverse shaft, H, which at its outer end or opposite end is provided with a spur-pinion, H², engaging a rack, H³, on the carriage C, for actuating the latter. The wheels F′ and F² are by preference made of different diameters, the former being small, and serving, by its rapid rotation when brought into contact with the wheel F, to retract the carriage quickly, and the latter, F², larger, for giving a slower operative feed to the carriage, and adjustable on its shaft G′ for adjusting said feed, as hereinafter explained. The bearings of the shafts G and G′ on the longitudinal bar A′ are applied to a longitudinally-sliding bar or plate, I, secured to said bar A′ by headed pins or bolts *i i′*, passing through short slots in the bar I and permitting its longitudinal adjustment. The rear or outer end of the plate or bar I has a lug or ear, I′, formed upon or attached to it, provided with a U-shaped notch in its upper end, (see Fig. 1ᵃ,) with which a pendent crank, *j*, on a short transverse shaft, J, engages. The pivotal ends or shaft portions of the crank are mounted in lugs or ears *k*, attached to the transverse frame-bar A″ on opposite sides of the bar I, and the ends or pivots of said shaft extending beyond said lugs, either or both, are squared to receive a socketed lever or wrench, J′, by means of which the crank can be rocked for moving the plate I and the ends of the shaft connected therewith forward or backward, for moving either of the wheels F and F² into or out of frictional contact with disk F, or to an intermediate position, leaving both wheels F′ and F² out of contact therewith, as described. The shaft E terminates in the disk F, and the shaft G′, arranged at right angles to shaft E, and in the same horizontal plane with the lower end thereof, is extended across the face of the disk F, and is grooved or feathered at *g* to permit the wheel F², correspondingly feathered or grooved, to be adjusted lengthwise of the shaft for moving it across the face of the disk F. As the wheel F² is moved outward toward the periphery of the disk F, its speed will be increased when engaged therewith, while by moving it inward its speed will be diminished until it reaches the axial center of said disk F, when its motion will cease. The hub of wheel $F^2$ is provided with annular ribs *f*, forming endless cogs, which engage with the teeth *l* of a segment formed on the forward end of a horizontal lever, L, pivoted to the transverse frame-bar A″, and by the lateral vibration of which the wheel $F^2$ can be adjusted on its shaft as desired. A flat ring or disk, *m*, is secured to the bar A″ underneath the lever L, and provided near its edge with radial notches or teeth *m′*, which engage corresponding teeth on the lower face of the lever and serve to hold the latter and the wheel F at any desired adjustment.

By adjusting the bar I longitudinally either wheel F′ or $F^2$ can be engaged in frictional contact with the disk F, or both can be removed from contact therewith, as desired, and the inner bearings, *g′*, of their shafts arranged in any convenient manner to accommodate the slight vibration of the shafts G and G′ necessary to provide for such adjustment.

Parts of the frame, carriage, and mechanism connected therewith not hereinabove particularly described may be constructed in any usual or preferred manner.

I am aware that a rotating face wheel or disk has been employed in combination with friction-wheels of different diameters adapted to be moved into or out of frictional engagement or contact with said face wheel or disk, and geared to the saw-mill carriage for operating the same, and I therefore do not claim such combination, broadly and irrespective of the arrangement of said parts; but,

Having now described my invention, I claim—

1. The combination, in a saw-mill feed mechanism, of a friction wheel or disk, F, secured to its actuating-shaft, and the shafts G G′, geared to the carriage and provided with friction wheels or disks arranged to bear upon the opposite faces of the disk F, and adapted to be moved together laterally—the one into and the other out of contact with said disk—by the joint lateral movement of their shafts, substantially as described.

2. In a saw-mill-carriage feed mechanism, the combination, with the saw-mandrel, of a shaft geared to said mandrel, and provided with a friction wheel or disk, F, secured to one end thereof, two parallel shafts, G and G′, geared to the carriage, and provided with friction-wheels F′ and $F^2$, arranged upon the same side of the axis, and to bear upon the opposite faces of disk F, and means for moving said friction-wheels F′ and $F^2$ for reversing the feed of the carriage, substantially as described.

3. The shaft E, geared to and actuated by the saw-mandrel, and provided with a friction disk or wheel, F, in combination with the shafts G and G′, geared to and operating the carriage, said shafts being mounted in bearings in sliding boxes, and provided with friction disks or wheels F′ and $F^2$, arranged on opposite sides of and adapted to be moved into or out of contact with the disk F, substantially as and for the purpose described.

4. The combination, in a saw-mill feed mechanism, of a friction wheel or disk, F, secured to the end of its actuating-shaft, and the shafts G G′, supported by bearings fixed to the frame at their ends nearest to the carriage, to gear therewith, provided with friction-wheels, and journaled at their opposite ends in a sliding bearing-block, I, substantially as and for the purpose described.

5. The combination, in a saw-mill-carriage feed mechanism, of the friction-disk F, secured to one end of a shaft geared to and driven by the saw-mandrel, the friction-disk $F^2$, mounted upon a shaft at right angles to the shaft E of disk F, and geared to the saw-mill carriage, said disk $F^2$ being made adjustable on its shaft across the face of the disk F, and means for adjusting said disk $F^2$ lengthwise of its shaft.

6. The combination, in a saw-mill feed mechanism, of a friction-disk secured to a shaft actuated by the saw-mandrel, friction-wheels arranged upon opposite sides of said disk, secured to shafts geared to and actuating the saw-mill carriage, and mounted in movable bearings, and means for adjusting one of the friction-wheels independently of the other across the face of the disk, substantially as described.

7. The combination, in a saw-mill-carriage feed mechanism, of the friction wheel or disk $F^2$, made adjustable across the face of its actuating-disk F, for varying the feed of the carriage, and provided with a hub or sleeve having annular cogs or teeth, a lever provided with a toothed segment engaging with said toothed hub or sleeve for adjusting said disk on its shaft, and means for holding said lever at any desired adjustment, substantially as described.

In testimony whereof I have hereunto set my hand this 24th day of November, A. D. 1883.

W. J. F. LIDDELL.

Witnesses:
VINTON LIDDELL,
T. S. FRANKLIN.